United States Patent Office 3,248,514
Patented Apr. 26, 1966

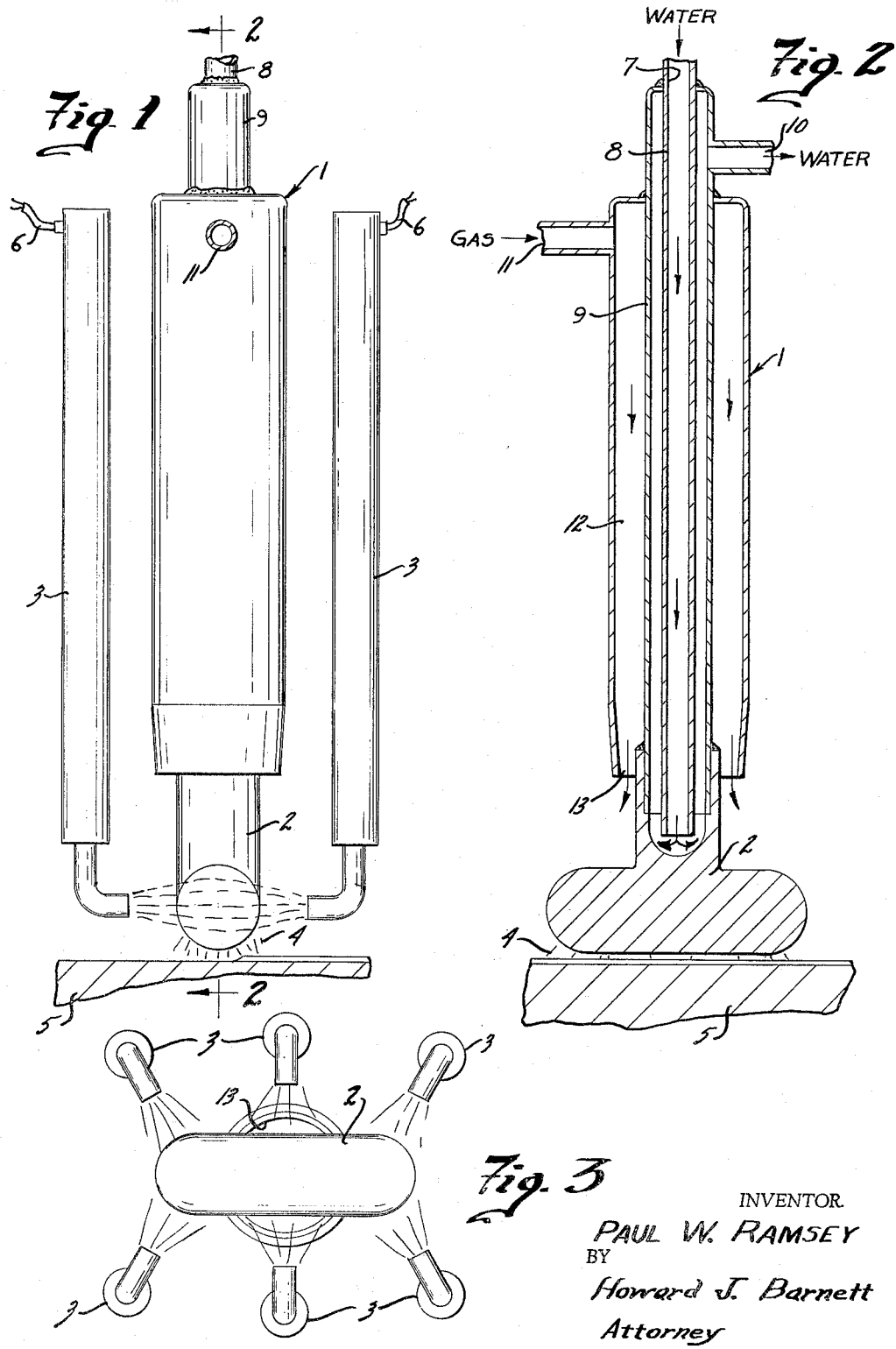

3,248,514
CATHODIC ARC CLEANING ELECTRODE
Paul W. Ramsey, Wauwatosa, Wis., assignor, by mesne assignments, to Harnischfeger Corporation, West Milwaukee, Wis., a corporation of Wisconsin
Filed Oct. 17, 1963, Ser. No. 316,996
2 Claims. (Cl. 219—123)

This invention relates to a cathodic arc cleaning electrode of special configuration and more particularly, to an electrode having a generally T-shaped end portion to provide greater area coverage of the workpiece being cleaned.

The main purpose of cathodic arc cleaning is to prepare a metal surface for cladding, or for application of some further material thereon. One problem is that the area of work surface covered by a single pass of the conventional electrode is relatively small.

The apparatus of the invention more than doubles the area of coverage, because of its configuration. In addition, electromagnetic coils are provided at the arc to cause it to deflect in the optimum manner for maximum cathodic cleaning effect.

The cathodic cleaning effect is disclosed fully in U.S. Patent 2,906,857, issued September 29, 1959, to O. H. Nestor. As explained there, the electrode is connected into a D.C. circuit on positive polarity. As the arc travels over the surface of the work, it tends to blast off all oxide film which tends to form on the surface of the workpiece, leaving the surface clean, and free of all impurities.

The present invention provides means for cleaning a much larger surface area by employing a modified electrode configuration. The T-shaped electrode, with or without electromagnetic oscillation of the arc, provides an efficient cathodic cleaning apparatus which cleanses a workpiece of all oxides more rapidly than with prior devices.

The drawings illustrate the presently preferred embodiment of the invention.

In the drawings:

FIG. 1 is a diagrammatic plan view of the cathodic cleaning head of the invention;

FIG. 2 is a sectional view of the apparatus taken on line 2—2 of FIG. 1 and showing the T-shaped electrode more clearly;

FIG. 3 is an end view taken on line 3—3 of FIG. 1 to show the electromagnetic coil arrangement.

As shown in the drawings, the apparatus of the invention includes a welding head 1 having an electrode 2 mounted therein. A plurality of electromagnetic coils 3 are disposed concentrically around the welding head 1 and electrode 2 to provide means for deflecting the path of arc 4 between the electrode 2 and a workpiece 5. Electrical leads 6 connect the electromagnetic coils 3 to an energizing source (not shown).

The welding head 1 is provided with a coolant, which enters through inlet passage 7, circulates down tube 8, into contact with electrode 2 and up through an outer concentric tube 9 to an outlet 10.

Shielding gas is supplied through gas inlet 11, down through the annular passage 12 in the welding head 1, and out the annular orifice 13 to shield the arc and protect the heated metal from oxidation.

Effective cathodic cleaning requires that the electrode 2 be the anode, and that the workpiece 5 be the cathode. The electrode 2 of the invention has an inverted T profile to cover more area. As can be seen in FIG. 2, the wide spread of the end of the electrode 2 makes it possible to cover about twice as much surface area as would ordinarily be possible with the conventionally shaped electrode.

The electromagnetic coils 3 are energized in successive pairs to deflect the arc 4 to different parts of the electrode surface, thereby assuring that the arc covers all the workpiece 5 over which the electrode 4 travels.

This invention provides a novel electrode configuration for use in cathodic cleaning. This electrode substantially doubles the cleaning rate of the electrode by causing the arc to cover twice the area in the same time.

Various modes of carrying out the invention are contemplated as being within the scope of the following claims particularly pointing out and distinctly claiming the subject matter which is regarded as the invention.

I claim:

1. A method of cathodic arc cleaning to remove oxides from the surface of a metal workpiece preparatary to cladding the surface with a non-corrosive metal, the steps comprising, providing an electrode having a generally inverted T-shaped profile maintained in close proximity to the surface of said workpiece, the cross-bar of said T-shaped electrode being disposed parallel to the surface of said workpiece, striking an arc between the tip of said electrode and said workpiece, and moving said electrode and said workpiece relative to each other in a direction of travel substantially perpendicular to the cross-bar of said electrode while maintaining the arc distance between said electrode and the workpiece, whereby maximum surface area of said workpiece is cathodically cleaned during each pass of said electrode over said workpiece.

2. The method of claim 1, including the step of applying an oscillating magnetic field to said arcing electrode tip to assure complete arc coverage of the portion of the workpiece surface over which the electrode travels.

References Cited by the Examiner

UNITED STATES PATENTS

| 510,777 | 12/1893 | Coffin | 219—123 X |
| 2,587,792 | 3/1952 | Von Sivers | 219—383 |
| 2,591,709 | 4/1952 | Lubatti | 13—18 |
| 2,599,179 | 6/1952 | Hopkins | 219—146 X |
| 2,922,869 | 1/1960 | Giannini et al. | 219—75 |
| 3,048,736 | 8/1962 | Emmerick | 219—123 X |

ANTHONY BARTIS, *Acting Primary Examiner.*
JOSEPH V. TRUHE, *Examiner.*